(12) United States Patent
Derks

(10) Patent No.: US 11,051,382 B2
(45) Date of Patent: Jun. 29, 2021

(54) DRIVER OF AN LED ARRAY

(71) Applicant: Lumileds LLC, San Jose, CA (US)

(72) Inventor: Henk Derks, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/762,634

(22) PCT Filed: Oct. 31, 2018

(86) PCT No.: PCT/EP2018/079828
§ 371 (c)(1),
(2) Date: May 8, 2020

(87) PCT Pub. No.: WO2019/091843
PCT Pub. Date: May 16, 2019

(65) Prior Publication Data
US 2020/0281061 A1 Sep. 3, 2020

(30) Foreign Application Priority Data
Nov. 10, 2017 (EP) ..................... 17201062

(51) Int. Cl.
*H05B 45/37* (2020.01)
*H05B 45/375* (2020.01)
(Continued)

(52) U.S. Cl.
CPC ........ *H05B 45/375* (2020.01); *H02M 3/1582* (2013.01); *H05B 45/38* (2020.01); *H05B 45/48* (2020.01)

(58) Field of Classification Search
CPC ........ H05B 45/37; H05B 45/38; H05B 45/40; H05B 45/46; H05B 45/48; H05B 45/52; H05B 45/375
See application file for complete search history.

(56) References Cited

U.S. PATENT DOCUMENTS

| 7,317,403 B2 * | 1/2008 | Grootes ................. H05B 45/46 340/815.45 |
| 2008/0144236 A1 * | 6/2008 | Chiang ................. H05B 45/37 361/18 |

(Continued)

OTHER PUBLICATIONS

PCT International Search Report & Written Opinion for PCT/EP2018/079828, dated Jan. 11, 2019, 17 pages.

*Primary Examiner* — Tung X Le
(74) *Attorney, Agent, or Firm* — Servilla Whitney LLC

(57) ABSTRACT

The invention describes a driver (1) of an array (2) of current-driven LEDs (20), comprising a voltage converter (10) arranged to generate a supply voltage ($V_{boost}$) to the LED array (2) and to adjust the supply voltage ($V_{boost}$) in response to a feedback signal (100); a number of current sources (CS1, ..., CSn) arranged to drive the LEDs (20) of the LED array (2); and a monitoring arrangement (M) adapted to monitor a current source voltage ($V_{cs1}, ..., V_{csn}$) relative to a voltage headroom (H) and to generate the feedback signal (100) on the basis of the headroom monitoring results. The invention further describes a device (4) comprising an LED array (2) and an embodiment of the inventive driver (1). The invention further describes method of driving an LED array (2).

13 Claims, 4 Drawing Sheets

(51) Int. Cl.
  *H05B 45/38* (2020.01)
  *H05B 45/48* (2020.01)
  *H02M 3/158* (2006.01)

(56) References Cited

U.S. PATENT DOCUMENTS

| | | | |
|---|---|---|---|
| 2009/0212717 A1* | 8/2009 | Trattler | H05B 45/46 |
| | | | 315/297 |
| 2009/0289559 A1 | 11/2009 | Tanaka et al. | |
| 2011/0121755 A1 | 5/2011 | Han | |
| 2012/0086357 A1* | 4/2012 | Tseng | H05B 45/46 |
| | | | 315/294 |
| 2016/0044759 A1* | 2/2016 | Lai | H05B 45/3725 |
| | | | 315/186 |
| 2017/0094734 A1 | 3/2017 | Hariman et al. | |

* cited by examiner

DRIVER OF AN LED ARRAY

CROSS-REFERENCE TO RELATED APPLICATIONS

This application is the National Stage entry of PCT/EP2018/079828, filed on Oct. 31, 2018, which claims priority to U.S. Provisional Application Ser. No. 17201062.1, filed Nov. 10, 2017, the entire disclosures of which are hereby incorporated by reference herein.

FIELD OF THE INVENTION

The invention describes a driver of an LED array of current-driven LEDs; a device; and a method of driving such an LED array.

BACKGROUND OF THE INVENTION

An array or matrix of light-emitting diodes (LEDs) may be used in various applications such as flash modules for mobile phones, automotive headlamp arrangements, etc. A segmented LED array may comprise several light-emitting diodes, each of which illuminates a part of the field (the region in space that is to be illuminated by the flash). An LED driver is required to drive the LEDs individually or collectively in order to obtain the desired illumination of the field. A segmented LED array (or simply "segmented array" in the following) generally requires a relatively complex driving and interconnect scheme.

The LEDs of a segmented array may have different static forward voltages owing to unavoidable process variations arising during the manufacture of the LEDs. The temperature of an LED will increase during operation, and the electrical behaviour of an LED is affected by temperature. As the junction temperature increases, the forward voltage decreases, leading to an increase in current consumption. For this reason, it is usually preferred to drive an LED from a current source (or current sink) instead of a voltage source. For example, some prior art drivers may implement a feedback-controlled current source for a segmented array. Known driver circuits are disclosed in US20110121755A1, US20090289559A1 and US20170094734A1. These types of drivers for an array or matrix of current-driven LEDs may be configured to operate within a relatively large voltage headroom of the current source/sink to ensure correct operation of each LED. However, such a solution is associated with a high power consumption, which is inefficient and can lead to rapid battery depletion in mobile devices. However, prior art circuits that address this problem suffer from various drawbacks or limitations, for example it may not be possible to drive all LED segments individually and simultaneously, and the power consumption may be unacceptably high if the arrangement is to be incorporated in a mobile device.

A further drawback of the known driver circuits is that they cannot easily be incorporated into a single module with a segmented LED array on account of their complexity and size. The overall device size is unfavourably large, and the manufacturing costs are also unfavourably high.

Therefore, it is an object of the invention to provide an improved way of driving a segmented LED array that overcomes the disadvantages indicated above.

SUMMARY OF THE INVENTION

The object of the invention is achieved by the driver of claim 1; by the device of claim 8; and by the method of claim 13 of driving an LED array.

According to the invention, the driver of an array of current-driven LEDs comprises a voltage converter arranged to generate a supply voltage to the LED array and to adjust the supply voltage in response to a feedback signal; a number of current regulators arranged to drive the LEDs of the LED array, wherein the cathode of each LED is connected to a current regulator; and a monitoring arrangement adapted to monitor voltages of the currents relative to a predefined range or "voltage headroom" and to generate the feedback signal on the basis of the headroom monitoring results. The monitoring arrangement comprises a plurality of window comparators, wherein the cathode of each LED is connected to an input of a window comparator, and wherein each window comparator is realised to generate a high comparator output when that LED cathode voltage is lower than the first input voltage, and to generate a low comparator output when that LED cathode voltage is higher than the second input voltage. The feedback signal comprises the bundled comparator outputs.

The invention is based on the insight that an LED is basically a current-driven device. This current might be sourced or sunk by an active device which is already part of the driver circuit and which has a high output impedance. The power dissipation in this active device will be minimal when the voltage across the device is also minimal.

In the context of the invention, the LED driver is to be understood to comprise a voltage converter that generates a supply voltage for the LED array and also the current sources/sinks that drive the LEDs. The terms "current source" and "current sink" may be used interchangeably since there is no intrinsic difference between a current source and a current sink (other than the direction of current flow), so that these terms may refer to the same object, depending on the perspective of the observer and the sign convention being used.

An advantage of the inventive driver is that it can be used in a circuit in which all LED segments are driven simultaneously. Another advantage is that it does not rely on the boost converter output voltage for control of the LEDs. Instead, the voltage converter is realised to adjust the supply voltage in response to the feedback signal. The feedback signal may be regarded as a type of error feedback, since it indicates that the supply voltage is not optimal and indicates the direction in which the supply voltage should be corrected. Another advantage of the inventive driver is that the supply voltage can be corrected very quickly, since feedback goes directly to the voltage converter. In contrast, functionally similar prior art circuits implement a serial bus and a processor to collect feedback about LED voltages, and the processing of the signals results in a significant delay in the correction of the supply voltage. A further advantage of the inventive driver is that it very favourably optimizes the power efficiency of the LED array, since the voltage drop across the LEDs is adjusted to a minimum during operation. Another advantage results from the compact circuit made possible by the inventive approach, so that the LED driver may be implemented in the LED array module, for example to reduce cost and/or device size, to optimize simplicity and/or functionality etc. Incorporating an LED driver chip in the same module as the LED array can reduce the number of required interconnects, and the total printed circuit board (PCB) area can be reduced. At the same time, desirable additional functions such as temperature monitoring and electrostatic discharge (ESD) protection can be added to the integrated driver chip.

With the inventive driver, it is possible to operate the LED array within a favourably tight headroom by identifying any departure of an LED electrode voltage from the headroom range and informing the voltage converter, which can then immediately adjust the supply voltage to correct the discrepancy.

The device according to the invention comprises an LED array with a plurality of LEDs, and an embodiment of the inventive driver.

According to the invention, the method of driving an LED array comprises increasing the supply voltage of the voltage converter when the feedback signal from the monitoring arrangement is higher than a threshold level; and decreasing the supply voltage of the voltage converter when the feedback signal from the monitoring arrangement is lower than a threshold level.

The dependent claims and the following description disclose particularly advantageous embodiments and features of the invention. Features of the embodiments may be combined as appropriate. Features described in the context of one claim category can apply equally to another claim category.

There are various ways of realising an array of current-driven LEDs. For example, a current source/sink may be provided for each LED of the array, so that there are as many current sources/sinks as there are LEDs in the array. Alternatively, in a multiplexed configuration, one current source/sink may drive several series-connected or parallel-connected LEDs.

The output voltage of the voltage converter is the sum of the voltage drop across the LED array and the voltage headroom of the current sinks/sources. The voltage headroom should be at least large enough to ensure that a current sink is able to operate properly. If its headroom is too low, the output impedance of a current sink decreases, and it cannot operate correctly. The inventive driver is used to ensure that the supply voltage provided by the voltage convertor is such that the voltage headroom of the current sinks is not greater than the level necessary for correct functioning of the current sinks/sources, thereby ensuring that the LEDs do not unnecessarily dissipate power. The monitoring arrangement of the inventive driver may therefore also be referred to as a "headroom monitor" in the following. A device incorporating an embodiment of the inventive driver may be realised in any application requiring a segmented array or matrix of LEDs, for example in an automotive front or rear lighting unit, in a camera flash module of a mobile device such as a smartphone, etc. In a mobile device, the segmented LED array may comprise a segmented flash that can be used to generate a brief burst of light to illuminate a field for a camera application. The segmented flash may also be used by a "flashlight" application to generate a constant beam of light. Particularly in such an application, the power consumption should be minimized in order to conserve battery power.

For a current-driven LED, an electrode of the LED is connected to the current source/sink, for example a controlled active device. When the current regulator is a current source, the anode of an LED is connected to the current source. The voltage of the current source/sink is therefore the voltage at the relevant LED electrode. When the current regulator is a current sink, the cathode of an LED is connected to the current sink, and—for the sake of simplicity and without restricting the invention in any way—this configuration may be assumed in the following. In a particularly preferred embodiment of the invention, the monitoring arrangement of the inventive driver compares the voltage at the relevant LED electrode to a voltage headroom defined by a lower bound and an upper bound. The inventive driver therefore preferably comprises a first input voltage as a reference voltage defining the lower bound of the voltage headroom, and a second input voltage as a reference defining the upper bound of the voltage headroom.

According to the invention, the monitoring arrangement comprises a plurality of comparators, wherein the relevant electrode of each LED is connected to an input of a comparator, and wherein each comparator is realised to generate a high comparator output when that LED electrode voltage is lower than the first input voltage, and to generate a low comparator output when that LED electrode voltage is higher than the second input voltage; and a feedback signal to the voltage converter, which feedback signal comprises the bundled comparator outputs. In this way, the monitoring arrangement employs comparators to check the level of the voltage at the cathodes of the LEDs. According to the invention, the monitoring arrangement comprises a plurality of window comparators to fulfill this function. In a particularly preferred embodiment of the invention, a comparator comprises a first operational amplifier with a first diode connected in forward direction between the output of the first operational amplifier and the comparator output; and a second operational amplifier with a second diode connected in reverse direction between the output of the second operational amplifier and the comparator output. As described above, the comparator also receives the bounding values of the voltage headroom, i.e. the first and second input voltages that define the voltage headroom. This type of comparator is generally referred to as a "window comparator", since it identifies whether a voltage level lies inside or outside a defined voltage "window" defined by the lower and upper bounds.

In a further preferred embodiment of the invention, the inverting inputs of the operational amplifiers of a comparator are both connected to the cathode of that comparator's LED, the non-inverting input of the first operational amplifier is connected to the first input voltage, and the non-inverting input of the second operational amplifier is connected to the second input voltage.

The voltage converter that drives the LEDs of the LED array may be realised as a boost converter, a buck-boost converter, a charge pump, etc. A voltage converter such as a boost converter is preferable, since it permits continuous voltage regulation. In a preferred embodiment of the invention, the voltage converter is realised to increase the supply voltage when the feedback signal is higher than a threshold level, and is realised to decrease the supply voltage when the feedback signal is lower than a threshold level. In an embodiment of the invention, the threshold level is preferably predefined as the expected voltage level when the headroom of each current source/sink is optimal, i.e. neither too low nor too high.

The voltage converter of the inventive driver can be realised as a dedicated device, for example in an extended driver ASIC (application-specific integrated circuit). In such an embodiment, the feedback signal is an internal control signal of the ASIC and the voltage converter is designed to respond to this signal as described above, i.e. to increase the supply voltage when the feedback signal is higher than a threshold level, and to decrease the supply voltage when the feedback signal is lower than a threshold level.

Alternatively, an off-the-shelf voltage converter can be used to build an embodiment of the inventive driver. In this case, the voltage converter should comprise an externally accessible feedback input. For example, an off-the-shelf buck-boost converter with a feedback input pin can be used by applying a polarity-inversed "error" signal to the feedback input pin as described above. The polarity inversion is given by the feedback signal being higher than a threshold when the supply voltage is insufficient, and lower than the threshold when the supply voltage is higher than it needs to be. In this "off-the-shelf" realisation, the threshold voltage can be the nominal voltage level of the buck-boost converter. The buck-boost converter will respond by adjusting the output supply voltage to achieve minimum dissipation in the LED driver's current sources.

In the monitoring arrangement of the inventive driver, the cathode of each LED is connected to a current source/sink. In a preferred embodiment of the invention, a current source/sink may be a current regulator comprising an active device such as a semiconductor transistor. The same principle can be used in an alternative embodiment in which a P-MOSPET or bipolar PNP transistor may be used as a current source with the supply voltage as reference instead of ground.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
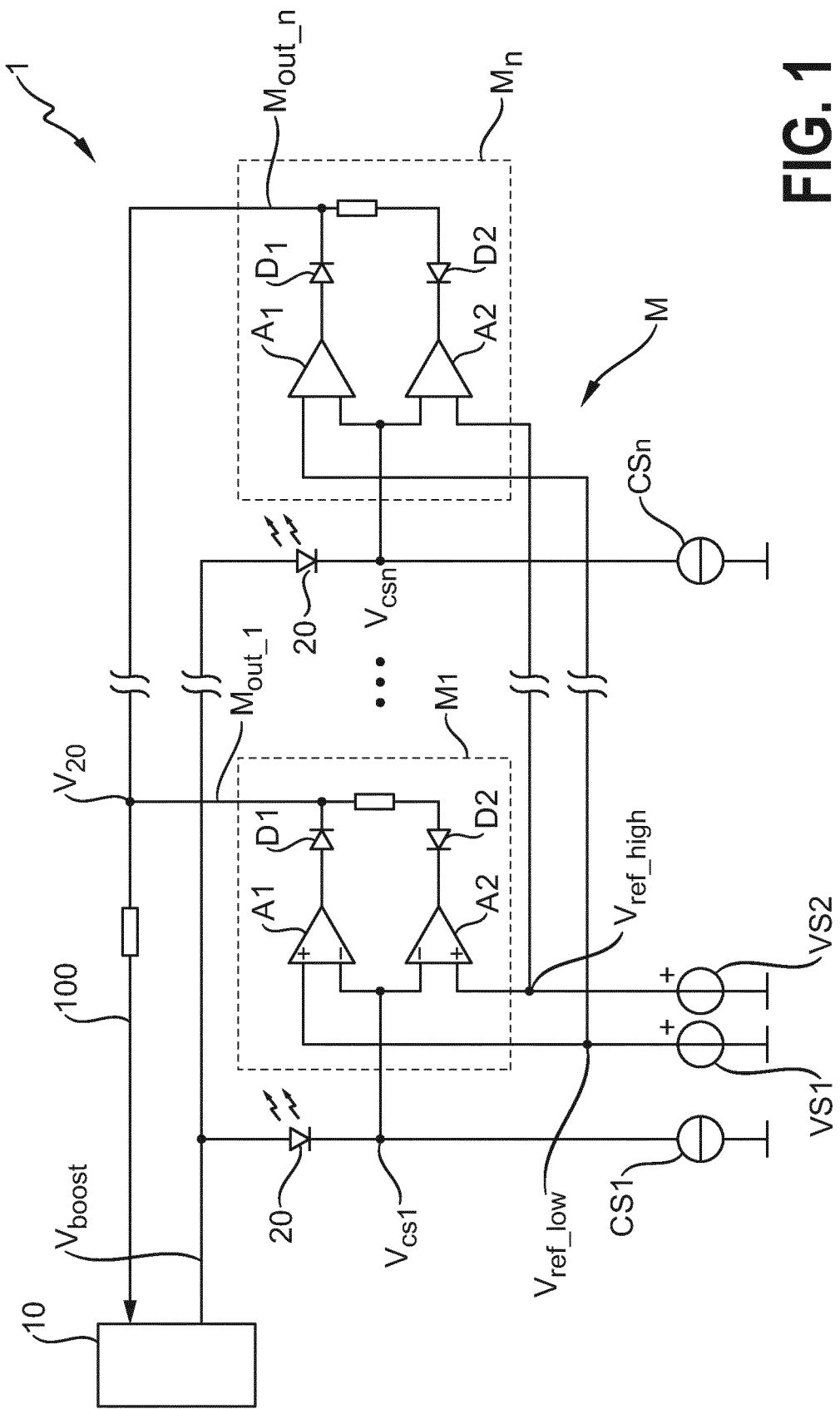
FIG. 1 shows an exemplary circuit diagram of an embodiment of the inventive driver.

FIG. 1 shows a basic circuit diagram of an embodiment of the inventive driver 1 for the LEDs 20 of an LED array, for example a segmented flash. For the sake of clarity, only two LEDs 20 or flash segments 20 are shown. Of course, a segmented flash may comprise more that just two LEDs 20, and the circuit shown in this diagram can be extended for use with a larger flash matrix. The LEDs 20 are current-driven, and in this exemplary embodiment, the driver circuit 1 comprises a current sink CS1, ..., CSn for each LED 20 of the LED array.

The driver circuit 1 includes a voltage converter 10 (in this case a boost converter) realised to generate a supply voltage $V_{boost}$ for the LEDs 20 as well as a voltage headroom for the current sinks CS1, ..., CSn. The supply voltage $V_{boost}$ for the LEDs 20 should be sufficient to ensure that the LEDs operate correctly, and that the voltage headroom is not higher than necessary for correct operation of the current sinks CS1, ..., CSn. To this end, the inventive driver 1 also comprises a monitoring arrangement M. With the monitoring arrangement M, as will be explained below, it is possible to operate the current-driven LEDs 20 within a favourably tight headroom. In this way, the inventive driver 1 can favourably reduce the overall power consumption.

In this embodiment, the cathode of each LED 20 is connected as shown to a current regulator (current sink/source) such as a controlled active device (bipolar transistor, MOSFET, etc.) that is already part of the driver circuit 1. Because the voltage across an active device is minimal, the power dissipation in an active device is also minimal. Including these current regulators into the functionality of the monitoring arrangement facilitates the low-power realisation of the headroom monitoring function.

The monitoring arrangement M comprises a number of window comparators M1, ..., Mn connected between the LEDs 20 and a feedback signal 100 to the voltage converter 10. The cathode of each LED 20 is connected to the inputs of a comparator M1, ..., Mn as shown. Each comparator M1, ..., Mn comprises a first operational amplifier A1 and a first diode D1 connected in forward direction between the output of the first operational amplifier A1 and the comparator output $M_{out\_1}, ..., M_{out\_n}$. The non-inverting input of the first operational amplifier A1 is connected to a first input voltage $V_{ref\_low}$ that defines the lower bound of a voltage headroom. Each comparator M1, ..., Mn also comprises a second operational amplifier A2 and a second diode D2 connected in reverse direction between the output of the second operational amplifier A2 and the comparator output $M_{out\_1}, ..., M_{out\_n}$. The non-inverting input of the second operational amplifier A2 is connected to the second input voltage $V_{ref\_high}$ that defines the upper bound of a voltage headroom The inverting inputs of both operational amplifiers A1, A2 of a comparator M1, ..., Mn are connected to the cathode of an LED 20.

The outputs $M_{out\_1}, ..., M_{out\_n}$ of the operational amplifiers A1, A2 are bundled, i.e. connected to a single line which is the feedback signal 100 to the boost converter 10 via a diode D1, D2 as shown. When the headroom of each current source/sink is optimal, i.e. neither too low nor too high, the voltage $V_{20}$ of the feedback signal 100 corresponds to a predefined threshold level, and the voltage converter 10 has no need to adjust the supply voltage $V_{boost}$.

As mentioned above, the cathode of each LED 20 is connected to a current regulator that is already part of the driver circuit 1. The inverting inputs of the operational amplifiers A1, A2 of each comparator M1, ..., Mn are therefore also connected to the same current sink. The comparator M1, ..., Mn described here is essentially a window comparator that checks whether the headroom of a current sink CS1, ..., CSn is within the optimum range defined by the upper bound $V_{ref\_high}$ and a lower bound $V_{ref\_low}$. These voltages are set by appropriate voltage sources VS1, VS2 as shown. The first operational amplifier A1 amplifies the difference between the lower bound $V_{ref\_low}$ and the voltage $V_{CS1}, ..., V_{CSn}$ at its LED cathode; the second operational amplifier A2 amplifies the difference between the upper bound $V_{ref\_high}$ and the voltage $V_{CS1}, ..., V_{CSn}$ at its LED cathode.

An operational amplifier is characterised by its high gain. A very small voltage difference between the inverting and non-inverting inputs will result in an output that is close to the relevant comparator supply level. The feedback voltage $V_{20}$ may therefore almost rise to the positive supply level when the voltage headroom of a current sink is insufficient. Equally, the feedback voltage $V_{20}$ may almost drop to the negative supply level (e.g. ground) when the voltage headroom of a current sink is higher than necessary. For this reason, a series resistor is provided to the feedback pin of the converter 10.

A comparator of the type described here has a low output resistance. Each comparator M1, ..., Mn comprises a resistor R1 between the cathode of the first diode D1 and the anode of the second diode D2 so that even a single comparator M1, ..., Mn with a high output level on its first operational amplifier A1 can pull the feedback voltage $V_{20}$ high (even if all other comparators M1, ..., Mn have a low output level on their second op-amp A2). In other words, correction of voltage Vcsx<lower headroom level $V_{ref\_low}$ has priority over the correction of voltage Vcsx> upper headroom level $V_{ref\_high}$, where Vcsx represents any one of the LED cathode voltages $V_{CS1}, \ldots, V_{CSn}$.

Figure 2:
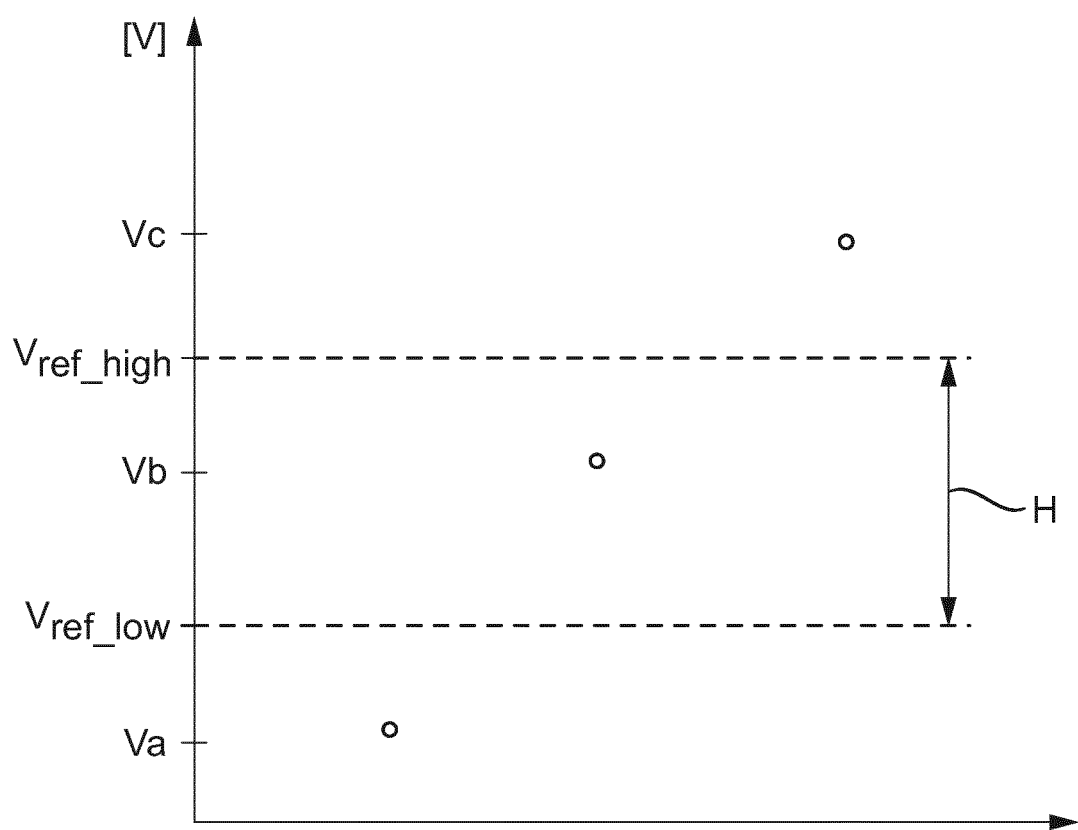
FIG. 2 shows a relationship between LED cathode voltages and a voltage headroom.

FIG. 2 illustrates the possible relationship between a voltage $V_a$, $V_b$, $V_c$ at an LED cathode and the voltage headroom H of the associated current source/sink, which may be assumed to be an active device as explained above. The voltage headroom H is defined by the upper and lower bounds $V_{ref\_high}$, $V_{ref\_low}$. For a voltage converter fed by a battery and supplying in the order of 5.5 V to an LED array with a voltage drop of approximately 3 V across each segment, the headroom may lie within about 0.2 V to 0.3 V, for example. The value of $V_{ref\_high}$ is determined by the maximum allowed dissipation of the active device and the regulation behaviour of the feedback loop. $V_{ref\_low}$ is set by the minimum allowed output impedance of the active device. The smaller the voltage drop across an active device, the lower its output impedance, and this is associated with poorer operating characteristics as a current source/sink.

As long as the voltage $V_{CS1}, \ldots, V_{CSn}$ at an LED cathode is not higher than the upper bound $V_{ref\_high}$ or lower than the lower bound $V_{ref\_low}$, the diodes D1, D2 at the outputs of the operational amplifiers A1, A2 are each reverse-biased, and the respective LED 20 has no effect on the feedback signal 100. This is the case for the voltage $V_b$, which lies within the upper and lower bounds $V_{ref\_high}$, $V_{ref\_low}$. However, if the voltage $V_{CS1}, \ldots, V_{CSn}$ at an LED cathode is lower than the lower bound $V_{ref\_low}$, the diode D1 at the output of the first operational amplifier A1 is forward biased, and the comparator output goes high. As a result, the feedback signal is raised above a threshold value. This is the case for the voltage $V_a$, which is less than the lower bound $V_{ref\_low}$. The resulting "high" feedback signal 100 is received by the boost converter 10, which responds by increasing the output voltage $V_{boost}$.

If the voltage $V_{CS1}, \ldots, V_{CSn}$ at an LED cathode is higher than the lower bound $V_{ref\_high}$, the diode D2 at the output of the operational amplifier A2 is forward biased, and the feedback signal 100 is pulled below the threshold level. The boost converter 10 responds by decreasing the output voltage $V_{boost}$.

Figure 3:
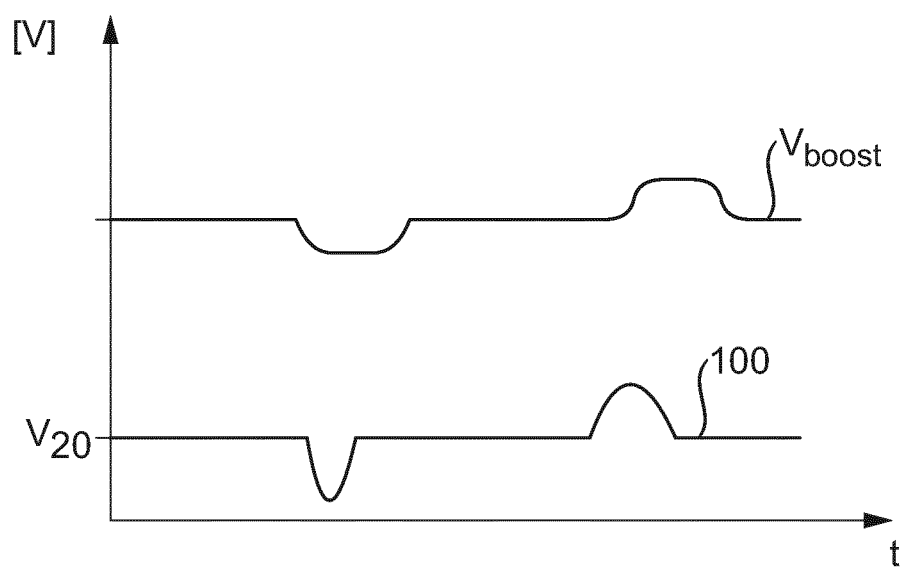
FIG. 3 shows a relationship between a supply voltage and a voltage converter feedback signal generated by an embodiment of the inventive driver.

FIG. 3 illustrates the relationship between the feedback signal 100 and the supply voltage $V_{boost}$. When the LEDs are driven within the headroom range defined by the upper and lower bounds as described above, the feedback signal will remain at the nominal threshold level $V_{20}$ and the supply voltage will remain at a nominal level as shown. When the feedback signal 100 is pulled low by a comparator, the voltage converter responds by decreasing the supply voltage $V_{boost}$. When a comparator output pushes the feedback signal 100 above the threshold level $V_{20}$, the voltage converter responds by increasing the supply voltage $V_{boost}$.

The correct current distribution over the various LEDs 20 or segments 20 has priority over any downward adjustment of the boost voltage $V_{boost}$. As described in FIG. 1 above, the monitoring arrangement M ensures that even a single current source with insufficient headroom will result in an increased output voltage $V_{boost}$, even if one or more of the other current sources might have too much headroom. To avoid a situation in which the output voltage $V_{boost}$ oscillates around an optimum setting, the difference between $V_{ref\_low}$ and $V_{ref\_high}$ can be increased. The difference can be increased during operation by means of a programmable setting. For example, the difference can be increased dynamically by increasing $V_{ref\_high}$ to avoid any simultaneous occurrence of high and low levels at the different comparator outputs.

Figure 4:
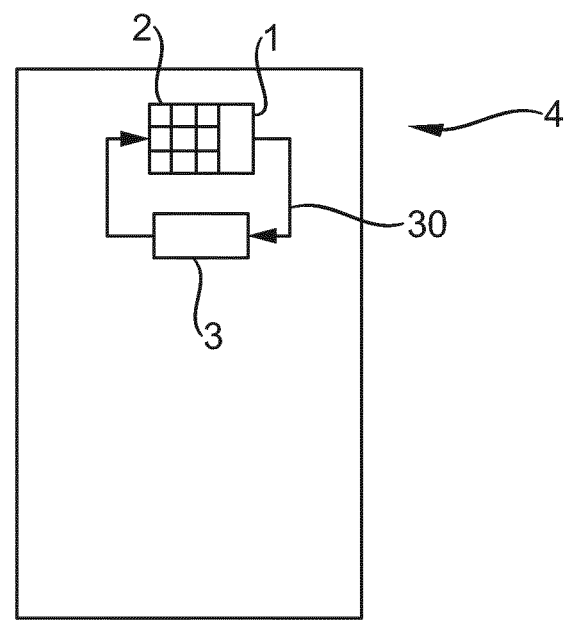
FIG. 4 shows an embodiment of the inventive device.

FIG. 4 shows an embodiment of an inventive device 4, in this case a mobile phone 4. The diagram indicates the position of a segmented flash 2. A voltage converter 10 is also indicated, to provide a supply voltage $V_{boost}$ to the LEDs of the segmented flash 2. An embodiment of the inventive driver 1 is shown, to provide a feedback signal 100 the voltage converter 10. As an alternative to using discrete components, the segmented flash 2 and the driver 1 can be realised as a single module, allowing for a favourably compact realisation. For example, the inventive driver 1 with its headroom monitoring arrangement M1, ..., Mn could be incorporated into a Power Management Integrated Circuit (PMIC) of a mobile phone chip set. To define a headroom voltage reference level in an ASIC, a known bandgap circuit may be implemented. Alternatively, the lower headroom level $V_{ref\_low}$ can be made dependent on the drop across an internal reference device driven by a known current.

Figure 5:
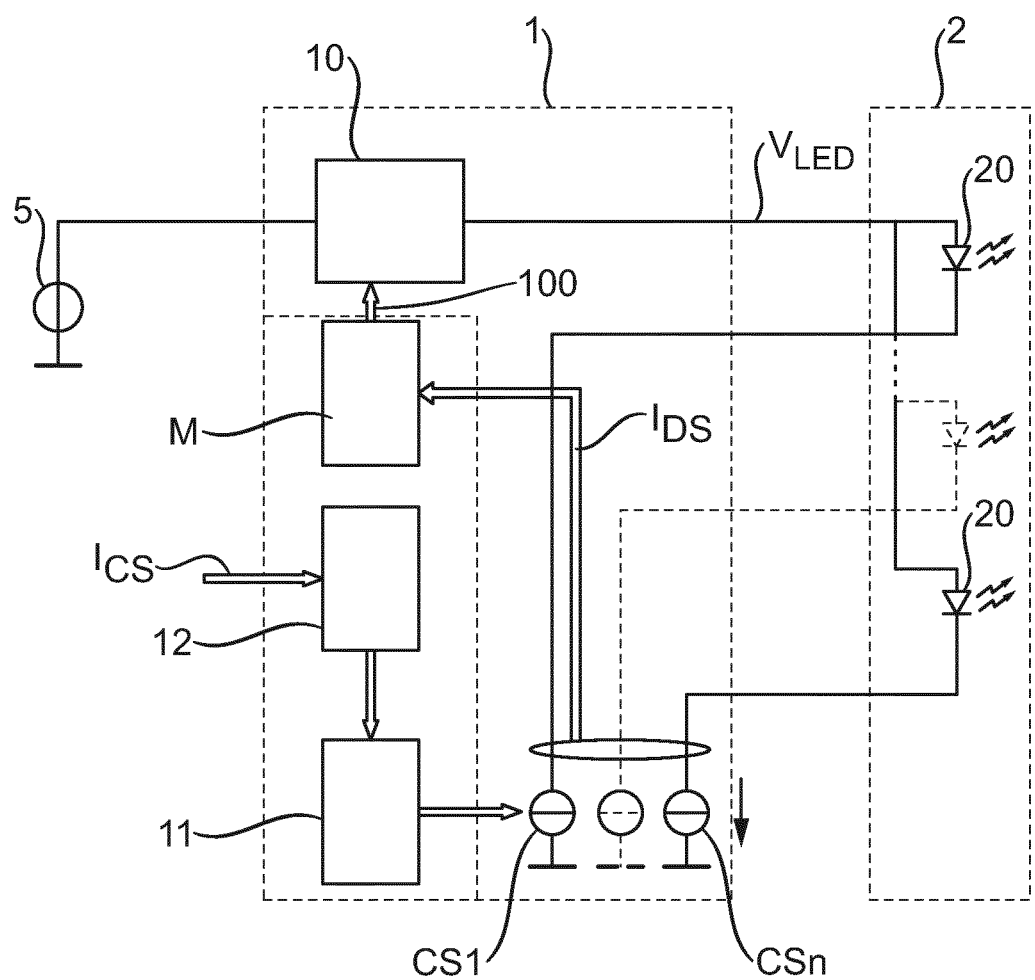
FIG. 5 shows a block diagram of the inventive driver.

FIG. 5 shows a generic block diagram showing the inventive driver 1 in relation to an LED array 2. The driver 1 comprises various functional modules, namely: a voltage converter 10 that is powered by a battery 5 and realised to provide a supply voltage $V_{LED}$ to the LED matrix 2; a current regulation arrangement (in this case an arrangement of current sinks CS1, ..., CSn; a current control module 11 for setting the current levels through the current sinks CS1, ..., CSn according to current setting inputs $I_{CS}$ received over a suitable interface 12; and a headroom monitoring arrangement M that monitors the drain-source currents $I_{DS}$.

When realised as an embodiment that implements direct monitoring of the headroom as described in FIG. 1 above, the voltage converter 10 is a boost converter with supply voltage $V_{LED}$ (supply voltage $V_{boost}$ of FIG. 1), and the headroom monitoring arrangement M is realised using comparators M1, ..., Mn connected to the relevant electrode of each LED 20, and the current control module 11.

In an alternative realisation that implements indirect monitoring of the headroom, the current regulators may comprise MOSFETs, and the realisation of the headroom monitoring arrangement M may be based on the $V_{GS}$–$V_{DS}$ dependency of a MOSFET for constant $I_{DS}$ as shown here (using the established terminology and abbreviations). The current levels $I_{CS}$, $I_{DS}$ are communicated over suitable bus interfaces.

In one realisation, the control voltage $V_{GS}$ of a MOSFET can be monitored (instead of monitoring its output voltage $V_{DS}$) and the supply voltage $V_{LED}$ from the converter 10 is regulated such that the gate-source voltage $V_{GS}$ of the MOSFET does not increase above a predefined upper threshold.

The headroom monitor M may implement a microcontroller with an analog-to-digital converter to measure the MOSFET drain-source currents. A feedback loop is used to keep the headroom for the current regulators in a correct operating region. As an indirect monitoring embodiment the implementation also partly digital, with an analogue-to-digital converter to digitize the current and a digital to analog converter or pulse-width modulator (PWM) modulator to generate the analog control voltages for the active devices. If the PWM duty cycle increases beyond a certain upper limit, the supply voltage $V_{LED}$ will be increased.

Similarly, if the PWM duty cycle decreases below a certain lower limit, the supply voltage $V_{LED}$ will be decreased. In this embodiment, the voltage headroom of the current sinks is represented by the upper and lower bounds of the PWM duty cycle.

Although the present invention has been disclosed in the form of preferred embodiments and variations thereon, it will be understood that numerous additional modifications and variations could be made thereto without departing from the scope of the invention. For example, while the inventive idea is to dynamically control an LED array supply voltage by continuously monitoring the voltage drop across the current sources/sinks relative to the upper and lower bounds of a voltage headroom, it is possible to dispense with an upper headroom reference voltage. Instead, it is possible to continuously adjust the supply voltage to the lowest value for which the voltages measured at the LED cathodes correspond to the lower headroom reference voltage.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

REFERENCE SIGNS monitoring arrangement M
comparators M1, . . . , Mn
comparator output $M_{out\_1}$, . . . , $M_{out\_n}$
LED array 2
LED 20
voltage converter 10
feedback signal 100
current control module 11
current control interface 12
device 4
voltage headroom H
voltage headroom lower bound $V_{ref\_low}$
voltage headroom upper bound $V_{ref\_high}$
cathode voltage $V_a$, $V_b$, $V_c$
operational amplifier A1, A2
diode D1, D2
drive voltage $V_{LED}$, $V_{boost}$
threshold level $V_{20}$
current sink CS1, . . . , CSn

The invention claimed is:

1. A driver of an array of current-driven light emitting diodes (LEDs), comprising:
a voltage converter arranged to generate a supply voltage to the LED array and to adjust the supply voltage in response to a feedback signal;
a plurality of current regulators arranged to drive the LEDs of the LED array, wherein the cathode of each LED is connected to a current regulator; and
a monitoring arrangement adapted to monitor a current regulator voltage relative to a voltage headroom and to generate the feedback signal on the basis of headroom monitoring results, the monitoring arrangement comprising a plurality of window comparators, and wherein the cathode of each current-driven LED is also connected to an input of a window comparator, and wherein the window comparator is realized to generate a high comparator output when the LED cathode voltage is lower than a first input voltage defining a lower bound of the voltage headroom and to generate a low comparator output when that LED cathode voltage is higher than a second input voltage defining an upper bound of the voltage headroom, and wherein the feedback signal comprises bundled comparator outputs.

2. The driver according to claim 1, wherein the current regulator comprises a controlled active device.

3. The driver according to claim 2, wherein the current regulator comprises a bipolar transistor or a MOSFET.

4. The driver according to claim 1, wherein the window comparator comprises:
a first operational amplifier and a first diode connected in forward direction between the output of the first operational amplifier and the comparator output; and
a second operational amplifier and a second diode connected in reverse direction between the output of the second operational amplifier and the comparator output.

5. The driver according to claim 4, wherein
inverting inputs of the operational amplifiers are connected to an electrode of an LED;
a non-inverting input of the first operational amplifier is connected to the first input voltage; and
a non-inverting input of the second operational amplifier is connected to the second input voltage.

6. The driver according to claim 5, wherein the window comparator comprises a resistor between the cathode of the first diode and the anode of the second diode so that a single comparator with a high output level on its first operational amplifier is adapted to push the feedback signal above a threshold level.

7. The driver according to claim 1, wherein an electrode of each LED is connected to a dedicated current regulator.

8. A device comprising:
the LED array comprising a plurality of current-driven LEDs; and
the driver according to claim 1, arranged to drive the LEDs.

9. The device according to claim 8, wherein the LED array is realized as a segmented flash comprising at least nine LEDs.

10. The device according to claim 8, in the form of a mobile phone.

11. The device according to claim 8, wherein the voltage converter is realized as any of a boost converter, a buck converter, or a buck-boost converter.

12. The device according to claim 8, comprising the plurality of current regulators, each configured to control the current through an LED of the LED array, and wherein an electrode of each LED is connected to a current regulator.

13. A method of driving the array of current-driven LEDs using the driver according to claim 1, which method comprises:
increasing the supply voltage ($V_{boost}$) of the voltage converter when the feedback signal from the monitoring arrangement (M) is higher than a threshold level ($V_{20}$); and
decreasing the supply voltage ($V_{boost}$) of the voltage converter (10) when the feedback signal from the monitoring arrangement (M) is lower than a threshold level ($V_{20}$).

* * * * *